United States Patent
Marra et al.

(10) Patent No.: US 9,378,295 B1
(45) Date of Patent: Jun. 28, 2016

(54) CLUSTERING CONTENT BASED ON ANTICIPATED CONTENT TREND TOPICS

(71) Applicant: Google Inc., Mountain View, CA (US)

(72) Inventors: Gregory Matthew Marra, San Francisco, CA (US); Frances Bordwell Haugen, Mountain View, CA (US)

(73) Assignee: Google Inc., Mountain View, CA (US)

(*) Notice: Subject to any disclaimer, the term of this patent is extended or adjusted under 35 U.S.C. 154(b) by 168 days.

(21) Appl. No.: 14/139,733

(22) Filed: Dec. 23, 2013

Related U.S. Application Data (60) Provisional application No. 61/746,066, filed on Dec. 26, 2012.

(51) Int. Cl.
  *G06F 17/00* (2006.01)
  *G06F 17/30* (2006.01)
(52) U.S. Cl.
  CPC .................. *G06F 17/3089* (2013.01)

(58) Field of Classification Search
  CPC ....... G06Q 50/01; G06Q 30/02; G06Q 10/10; G06Q 30/0251; G06Q 10/063; G06Q 30/0255
  See application file for complete search history.

(56) References Cited

U.S. PATENT DOCUMENTS

2014/0129331 A1* 5/2014 Spivack ............. G06Q 30/0269
  705/14.53

* cited by examiner

*Primary Examiner* — Truong Vo
(74) *Attorney, Agent, or Firm* — McDermott Will & Emery LLP (57) ABSTRACT

A computer-implemented method includes identifying a content trend topic that is anticipated to occur at a future time, wherein the content trend topic is associated with a future event. The method also includes analyzing web content to determine whether the web content meets a predetermined relevance threshold for the identified content trend topic, associating the identified content trend topic with each piece of web content that meets the relevance threshold, and clustering web content associated with the identified content trend topic for provisioning when the content trend topic that is anticipated to occur at the future time does occur. Systems and machine-readable media are also provided.

20 Claims, 5 Drawing Sheets

CLUSTERING CONTENT BASED ON ANTICIPATED CONTENT TREND TOPICS

CROSS-REFERENCE TO RELATED APPLICATIONS

The present application claims the benefit of priority under 35 U.S.C. §119 from U.S. Provisional Patent Application Ser. No. 61/746,066 entitled "CLUSTERING CONTENT BASED ON ANTICIPATED CONTENT TREND TOPICS", filed on Dec. 26, 2012, the disclosure of which is hereby incorporated by reference in its entirety for all purposes.

BACKGROUND

Currently, clustering techniques are applied to content that is posted by users in social networks, information that is posted by news organizations, videos, and photographs. Clusters are created in real time as new content is posted.

SUMMARY

The subject technology relates to a computer-implemented method that includes identifying a content trend topic that is anticipated to occur at a future time, wherein the content trend topic is associated with a future event. The method also includes analyzing web content to determine whether the web content meets a predetermined relevance threshold for the identified content trend topic, and associating the identified content trend topic with each piece of web content that meets the relevance threshold. The method further includes clustering web content associated with the identified content trend topic for provisioning when the content trend topic that is anticipated to occur at the future time does occur.

These and other aspects can include one or more of the following features. The identified content trend topic can be associated with each piece of web content by marking each piece of the web content with metadata corresponding to the identified content trend topic. The identified content trend topic can also be associated with each piece of web content by generating a reverse index for the identified content trend topic, the reverse index indexing each piece of the web content that is associated with the identified content trend topic.

Additionally, the content trend topic that is anticipated to occur at the future time can be determined based on analyzing web content including information for the associated event. The content trend topic that is anticipated to occur at the future time can also be determined based on manual entry. The content trend topic that is anticipated to occur at the future time can also be determined based on identifying a repeating pattern of occurrences of past content trend topics. The content trend topic that is anticipated to occur at the future time can also be determined based on an on-line knowledge database The method can also include determining whether the content trend topic that is anticipated to occur at the future time has occurred, and if the content trend topic has occurred, providing the clustered web content for display to a user. Whether the content trend topic that is anticipated to occur at the future time has occurred can be determined based on analyzing web content that is selected for display to a user of a social network. Also, the web content can be at least one of text entry, video clip, audio clip, web articles, or location information of a user.

The subject technology further relates to a system that includes a memory storing executable instructions and a processor coupled to the memory configured to execute the stored executable instructions to identify a topic that is likely to correspond to a future content trend, wherein the future content trend is based on at least one of an anticipated content trend or a manually entered content trend. The processor is also configured to analyze one or more posts that are shared on a social network to determine whether the one or more posts meet a predetermined relevance threshold for the identified topic, associate the identified topic with each of the one or more posts that meet the relevance threshold, and cluster the one or more posts associated with the identified topic for provisioning when the future content trend occurs.

These and other aspects can include one or more of the following features. The identified topic can be associated with the each of the one or more web posts by generating a reverse index for the identified topic, the revise index indexing each of the one or more web posts associated with the identified topic. The identified topic can be associated with each of the one or more posts by marking each of the one or more posts with metadata corresponding to the identified topic.

Additionally, the anticipated future content trend can be determined based on identifying a repeating pattern of occurrences of past content trends. The future content trend can be determined based on an on-line knowledge database. The processor can further be configured to determine whether the future content trend has occurred, and if the future content trend has occurred, provide the clustered posts for display to a user. Whether the future content trend has occurred can be determined based on analyzing posts that are selected for display to the user of the social network. The one or more posts can be at least one of text entry, video clip, audio clip, web article, or location information of one or more users of the social network.

The disclosed technology also relates to a machine-readable storage medium comprising instructions stored therein, which when executed by processors, cause the processors to perform operations including identifying, based on analyzing web content including information for an event, a content trend topic that is anticipated to occur at a future time, wherein the content trend topic is associated with the event. The operations also include analyzing web content that is shared on a social network to determine whether the web content meets a predetermined relevance threshold for the identified content trend topic, and associating the identified content trend topic with each piece of web content that meets the relevance threshold, by marking each piece of the web content with metadata corresponding to the identified content trend topic. The operations further include clustering web content associated with the identified content trend topic for provisioning when the content trend topic that is anticipated to occur at the future time occurs, determining whether the content trend topic that is anticipated to occur at the future time has occurred, based on analyzing web content that is selected for display to the user of the social network. The operations yet further include provisioning the clustered web content to the user of the social network when the anticipated future trend does occur.

These and other aspects can include one or more of the following features. The web content can be at least one of text entry, video clip, audio clip, web article, or location information of one or more users of the social network.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purposes of explanation, several aspects of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

When clusters are created in real time as new content is shared or posted, the clustering process is reactive. Time costs and calculation costs of clustering occur at the time of sharing or posting. It may be beneficial to proactively cluster content to reduce calculation time and costs.

According to various aspects of the subject technology, a method and a system for clustering content based on anticipated future trends is provided. A popular event is likely to become a frequent topic for web content (e.g., social network posts, video clips, music clips, or links to articles) that are shared or posted on the Web during, and for a certain period of time preceding and following, the occurrence of the popular event. For example, the 2012 London Olympic games are likely to become a frequent topic of status updates, articles, or video clips that are shared on social networks or posted on blogs during, and for a certain period of time before and after, the Olympic games. Thus, it can be said that a trend associated with the popular event occurs if the number of pieces of web content that are shared or posted on the Web whose topic relates to the popular event exceeds a predetermined amount, or increases by a predetermined amount. Also, a period of time during which the number of pieces of web content that are shared or posted on the Web whose topic relates to the popular event exceeds a predetermined amount, or increases by a predetermined amount may be called a "trend time."

A future trend associated with an event that is likely to occur at a future time can be anticipated beforehand, and existing web content and/or web content that is newly shared or posted that relates to the topic of the anticipated future trend can be identified. The trend time of the anticipated future trend may also be anticipated beforehand. The existing and newly shared web content that is identified as being related to the topic of the anticipated future trend can also be clustered prior to the trend time of the anticipated future trend. Identifying and clustering the web content that relates to the topic of the anticipated future trend before the trend time of the anticipated future trend, reduces calculation time and cost for clustering and serving the web content to the users.

The method includes identifying a topic of a content trend that is anticipated to occur at a future time. For the remainder of the descriptions of the subject technology, reference to an "occurrence" of a topic of a content trend ("content trend topic") denotes that the content trend associated with the content trend topic has occurred. The anticipated content trend topic may be determined based on knowledge of popular events that are scheduled to take place on a future date (e.g., concerts, sporting events, holidays, annual festivals, movie releases, TV shows, the public release of new gadgets, and the like). For example, "Olympics" may be identified as the content trend topic that is anticipated to occur at the future time, based on the knowledge that the Olympic games will take place during August, 2012. Such knowledge of events may be obtained automatically by analyzing existing web content, or obtained manually through human entry. For example, a web content shared on January 2012 may include information that the Olympic games will take place in London during August, 2012. Based on this shared content, a future trend with the topic "Olympics" may be determined as having a trend time around and during August, 2012. As another example, a person having knowledge that the Olympic games will take place during August 2012 may make an entry indicating that a future content trend topic "Olympics" may occur with a trend time of around and during August 2012.

The anticipated content trend topics and their trend times can also be determined from previous occurrences of similar content trend topics. For example, past trend records may show that a content trend topic "Olympics" has occurred every four years during the summer, and the last such content trend topic occurred during the summer of 2008. Based on analysis of such record, it may be anticipated that a content trend topic "Olympics" will occur with a trend time of summer of 2012. Anticipated content trend topics and their trend times may also be determined based on information on events that occur periodically (e.g., Olympics, presidential elections, seasons, TV shows, birthdays, or national holidays). For example, rather than analyzing past content trend topics, it may be known that the Olympic games take place every four years in the summer, and the last Olympic games took place during the summer of 2008. Information of events that occur periodically may be obtained, for example, from news articles, websites, manual human entry, or knowledge databases (e.g., on-line encyclopedia). Based on such information, it may be anticipated that an anticipated content trend topic "Olympics" may occur with a trend time of summer 2012. Information from multiple sources may be used to obtain more detailed information on the anticipated content trend topic, and may be used to narrow down the anticipated trend time. For example, information that the Olympic games occur every four years may be obtained from a knowledge database, and the exact dates for the 2012 Olympics may be obtained from a news article.

The occurrence of anticipated content trend topics may also be anticipated based on information which may suggest an increased probability of occurrence of an event. For example, web content such as a status update posted on a social network or a news article may indicate that a popular celebrity is seriously ill. Based on such information, an anticipated content trend topic relating to the death of the ill celebrity may be determined. The trend time may also be determined based on such information. For example, if the information indicating the illness of the popular celebrity also indicates a doctor's diagnosis that the celebrity only has 6 months to live, then the trend time may be determined as a certain period of time at 6 months in the future. However, if no information is available to determine the trend time, the trend time may not be determined.

Once an anticipated content trend topic has been identified, web content is analyzed to determine whether the web content relates to the identified anticipated content trend topic. The analyzed web content can be scored to indicate the degree of relatedness of the web content to the identified anticipated content trend topic. For example, for an anticipated content trend topic "Olympics," a score between 0-10 may be given for each analyzed shared content, 0 indicating the least relatedness, and 10 indicating the most relatedness. If the score for the web content exceeds a predetermined relevance threshold, it is determined that the web content is related to the anticipated content trend topic. If it is determined that the web content is related to the anticipated content trend topic, association is made between the determined web content and the anticipated content trend topic. Specifically, the web content is identified as being related to the anticipated content trend topic. The web content is identified, for example, by marking the web content with metadata which indicates that the web content meets the relevance threshold for the anticipated content trend topic.

A reverse index may also be created for each anticipated content trend topic. The reverse index for an anticipated content trend topic indexes the web content which is determined to be related to the anticipated content trend topic. For example, a reverse index for the anticipated content trend topic "Olympics" may index all pieces of web content that are given a score of 5 or higher, and include information for quickly accessing those pieces of web content. In an aspect of the subject technology, rather than identifying web content as being related to an anticipated content trend topic only if the web content is given a score exceeding a predetermined threshold, the score may be recorded as metadata of the web content regardless of the value of the score.

Web content that is determined to be related to an anticipated content trend topic is clustered, or grouped together, for provisioning when the anticipated content trend topic occurs. The web content determined to be related to the anticipated content trend topic is clustered such that the clustered web content may be managed as a group and/or accessed relatively quickly as a group. For example, the clustered web content may be stored in a same data store, or otherwise may be stored to be logically in proximity with each other. Clustered web content may be provided for display, or "served," on a client terminal as a group. For example, when a user accesses a social network using a client terminal, the user may be served with various types of social updates (e.g., new content that has been shared or posted by the user's friends of the social network since the user last accessed the social network). Among the different types of social updates that are served, the pieces of web content that are clustered may be served as a single unit. Specifically, where pieces of web content related to the topic "Olympics" are clustered together, among the social updates, all pieces of web content that relate to the topic "Olympics" may be displayed to the user in a separate section.

The clustered pieces of web content may be served to the users at respective determined trend times of the anticipated content trend topics. Determination may also be made whether an anticipated content trend topic has occurred, separately from determining the trend time, and the clustered pieces of web content may be served to the user when it is determined that the anticipated content trend topic has occurred. For example, when the user in the example of the preceding paragraph is served with the various social updates, determination may be made that the social updates include more than a predetermined number (e.g., four) of pieces of web content associated with one of the identified anticipated content trend topics, "Olympics." Such determination may be used as basis for determining that the anticipated content trend topic "Olympics" has occurred, and in addition to the pieces of web content associated with "Olympics" that are already included in the social update, the clustered pieces of web content that are associated with "Olympics" may also be served to the user, along with the rest of the social updates.

The phrase "social network" as used herein encompasses its plain and ordinary meaning, including, but not limited to, an online service, platform or site that focuses on the building and reflecting of social associations and interactions among users. Users of the social network may create social associations with one another (e.g., identify other users as friends). Such user associations may be defined on a user-to-user basis, or as a group of users associated through membership within a group. The user associations may be symmetrical or asymmetrical.

The phrase "friend" as used herein encompasses its plain and ordinary meaning. The phrase "friend" as used herein also encompasses the meaning as used in the context of social networks, including, but not limited to, a user of a social network with which another user has an association. A user of a social network may grant access to more information to other users who are friends as compared to users who are not.

Figure 1:
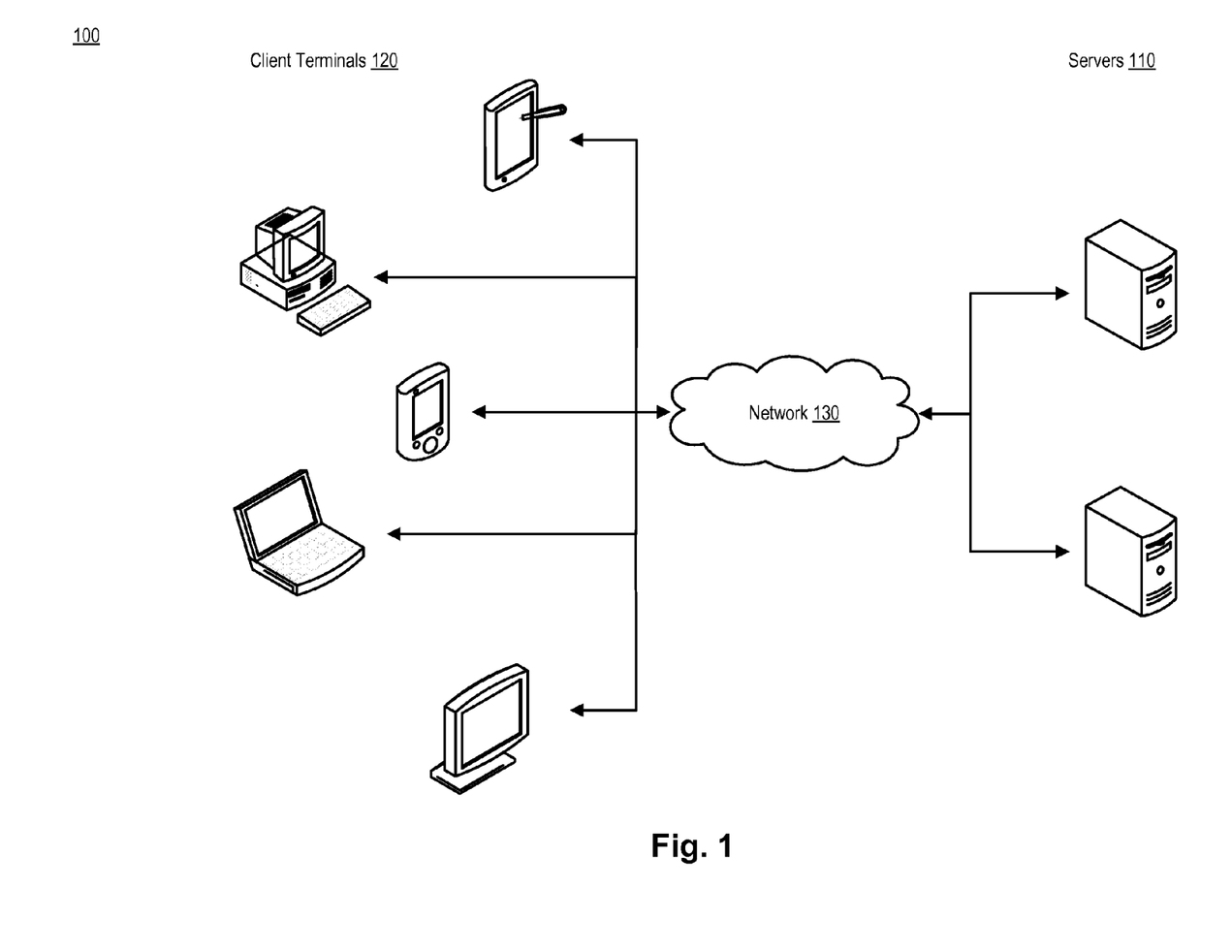
FIG. 1 illustrates an example architecture for clustering content based on anticipated content trend topics.

FIG. 1 illustrates an example architecture 100 for clustering content based on anticipated future trends. The architecture 100 includes servers 110 and client terminals 120 connected over a network 130. The client terminals 120 may be any device having a processor, memory and communications capability for accessing a social network. The client terminals 120 may also communicate with the servers 110 to send and receive data for clustering content based on anticipated future trends. The client terminals 120 may be, for example, mobile devices such as smartphones, tablet computers, PDAs, laptop computers or navigation systems and desktop computers.

The servers 110 may be any device having a processor, memory, and communications capability for communicating with the client terminals 120 to cluster content based on anticipated content trend topics. The servers 110 may be a single server, or may be two or more servers communicating with each other to provide the functionalities for customizing shared web resource snapshots. For example, the servers 110 may be multiple servers arranged in a cloud computing configuration.

The network 130 may include, for example, any one or more of a personal area network (PAN), a local area network (LAN), a campus area network (CAN), a metropolitan area network (MAN), a wide area network (WAN), a broadband network (BBN), the Internet, and the like. Further, the network 130 can include, but is not limited to, any one or more of the following network topologies, including a bus network, a star network, a ring network, a mesh network, a star-bus network, tree or hierarchical network, and the like.

Figure 2:
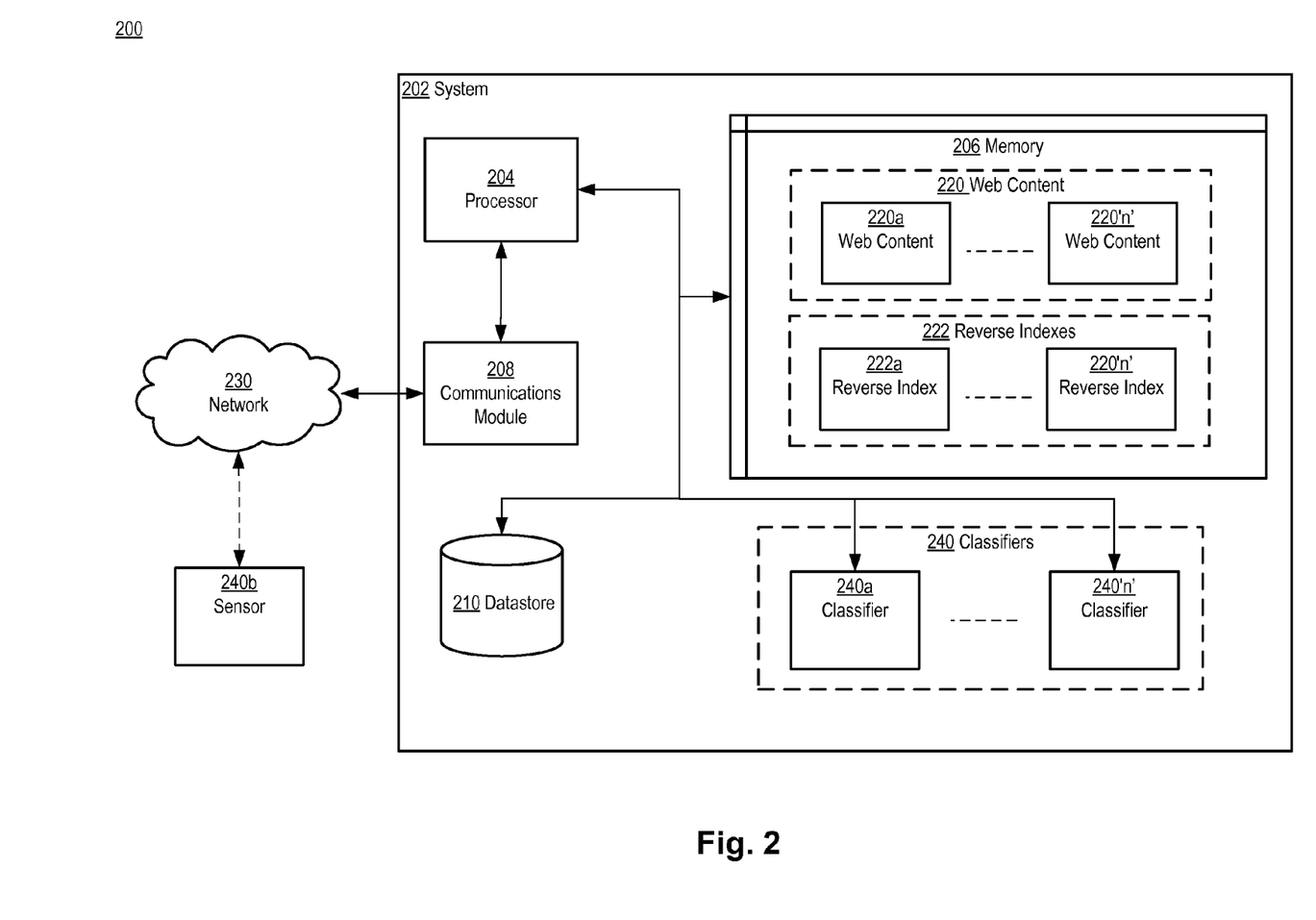
FIG. 2 is a block diagram illustrating an example system for clustering content based on anticipated content trend topics.

FIG. 2 is a block diagram 200 illustrating an example system 202 for clustering content based on anticipated content trend topics. The system 202 may be implemented, for example, at one of servers 110. The system 202 may also be implemented, for example, across multiple servers 110, at one of the client terminals 120, or spread across the servers 110 and client terminals 120. The system 202 includes a processor 204 and a memory 206. The system 202 may also include a communications module 208, and may be connected to a network 230 via the communications module 208. The network 230 may be, for example, the network 130 of FIG. 1. The communications module 208 may be configured to interface with the network 230 to send and receive information, such as data, requests, responses, and commands to other devices (e.g., servers 110 or client terminals 120) or systems on the network 230. The communications module 208 may be, for example, modems, Ethernet cards or mobile broadband adaptors.

The memory 206 includes a plurality of pieces of web content 220a-220'n' (collectively called web content 220) and reverse indexes 222a-222'n' (collectively called reverse indexes 222). Web content 220 may be content such as, for example, text, video clip, music clip, a link to a news article, or a blog post that a user of a social network has shared with other users. Reverse indexes 222 are indexes which index the pieces of web content 220 that relate to a certain future content trend topic. For example, the reverse index 222a may index all pieces of web content 220 that are determined to be related to an anticipated content trend topic "Olympics."

The system 202 also includes a plurality of modules called classifiers 240a-240'n' (collectively called classifiers 240). Each of the classifiers 240 contain logic for analyzing the web content 220 to determine whether the web content is related to a specific future content trend topic. For each piece of the web content 220, the logic may generate a score which indicates a degree of relatedness to the anticipated content trend topic, and determine the web content as being related to the anticipated content trend topic if the score exceeds a predetermined threshold. A classifier 240 may be provided for each anticipated content trend topic for which clustering is to be made. The classifiers 240 may be in communication with the processor 204 and the memory 206, or may be integrated with the memory 206. In an aspect of the subject technology, in addition to, or instead of, the classifiers 240, a general classifier (not shown) may be provided which analyzes the web content 220 to determine the relatedness to all of the anticipated content trend topics for which clusterings are to be made.

The system 202 may also include a data store 210, which may also store the web content 220 and/or the reverse indexes 222. The data store 210 may be integrated with the memory 206, or may be independent from the memory and be in communication with the processor 204 and the memory. The data store 210 may also be implemented to be independent from the system 202 and in communication with the system.

The processor 204 is configured to execute instructions, such as instructions physically coded into the processor, instructions received in the form of software from the memory 206, or a combination of both. For example, the processor 204 is configured to execute instructions to identify a topic of a content trend topic that is anticipated to occur at a future time, where the content trend topic is associated with an event. The processor 204 is also configured to analyze the web content 220 to determine whether the web content meets a predetermined relevance threshold for the identified content trend topic, and associate the identified content trend topic with each piece of the web content 220 that meets the relevance threshold. The analysis and/or the association may be made, for example, by one or more classifiers 240. The processor 204 is further configured to cluster the web content 220 associated with the identified content trend topic for provisioning when the content trend topic that is anticipated to occur at the future time has occurred.

Figure 3:
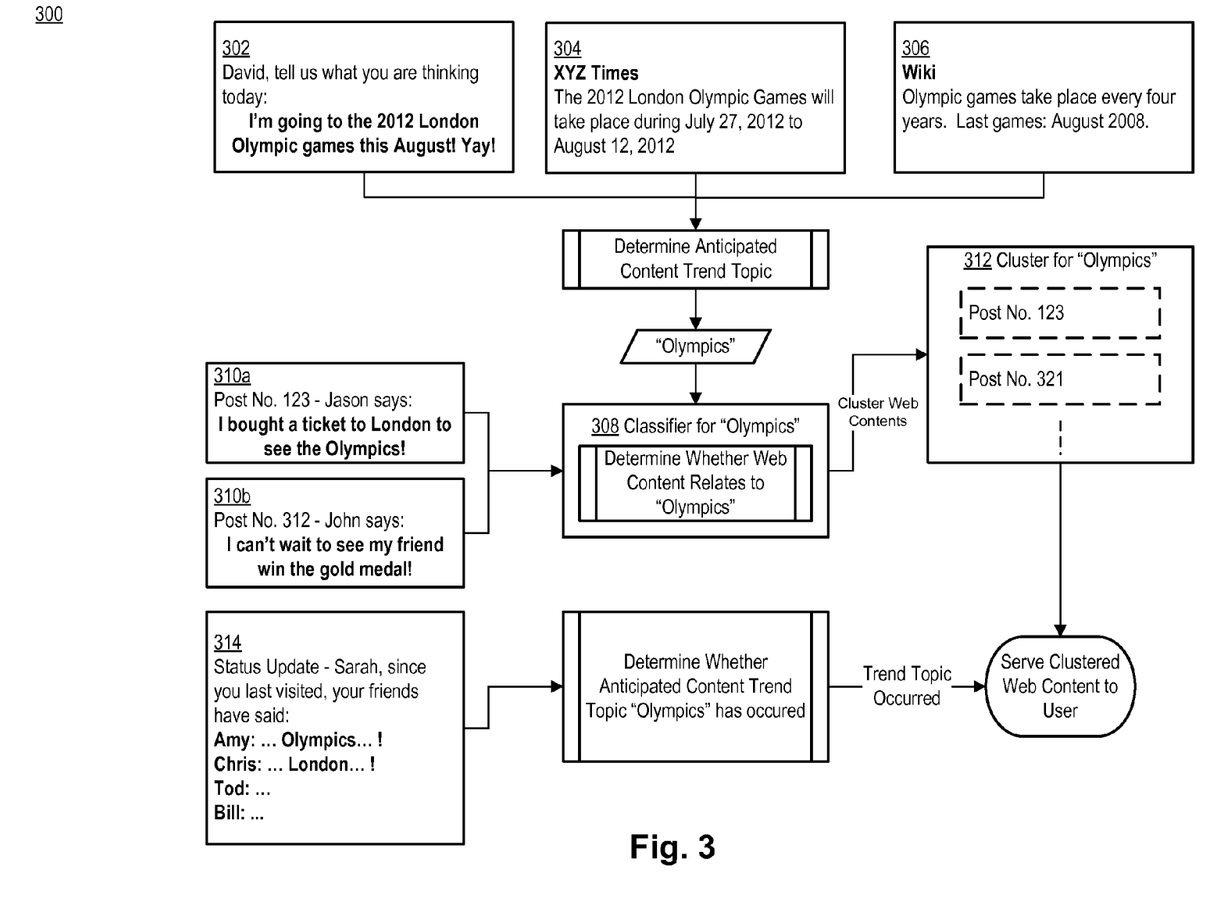
FIG. 3 is a diagram illustrating example operations for clustering content based on anticipated content trend topics.

FIG. 3 is a diagram 300 illustrating example operations for clustering content based on anticipated content trend topics. The operations may be performed, for example, by system 202.

Existing web content (e.g., web content 220), such as status update 302 posted on a social network by a user of the social network, news article 304, or on-line knowledge database 306, may be analyzed to determine a content trend topic that is anticipated to occur at a future time. The status update 302 indicates that the 2012 London Olympics will be held during August 2012. Based on such information, determination may be made of an anticipated content trend topic "Olympics" with a trend time of August 2012. The determination of the anticipated content trend topic "Olympics" and the trend time may also be determined based on the news article 304, which reports a news article indicating that the 2012 London Olympics will take place during Jul. 27, 2012, to Aug. 12, 2012. The anticipated content trend topic and its trend time may further be determined based on the knowledge database 306, which indicates that the summer Olympic games are held every four years, and that the last Olympic games were held during August 2008. Based on such information, determination of the anticipated content trend topic "Olympics" with a trend time of August 2012 may be made.

In the foregoing descriptions, the trend times associated with the anticipated content trend topic may be determined such that the trend time spans a period including the duration of the 2012 Olympic games and a predetermined period of time before and after the Olympic games. The predetermined period of time before and after the Olympic games will be determined based on various factors including, for example, the expected popularity of the Olympic games. Also, if insufficient information is available to determine a trend time, the trend time may not be determined.

After an anticipated content trend topic is determined, a classifier (e.g., classifiers 240) may be generated which analyzes web content (e.g., web content 220) that is already shared/posted or newly shared/posted on the web to determine if the web content relates to the anticipated content trend topic. Diagram 300 shows pieces of web content 310a and 310b which are posted on the web. The pieces of web content 310a and 310b discuss London Olympics and gold medal, respectively. Diagram 300 also shows a classifier 308 which analyzes the pieces of web content 310a and 310b to determine whether they are related to the anticipated content trend topic "Olympics." In determining whether the pieces of web content 310a and 310b are related to "Olympics," the classifier 308 may score each piece of web content 310a and 310b according to the degree of relatedness to "Olympics." Scoring may be performed, for example, by counting the number of predetermined keywords which relate to "Olympics" that are present in the web content. Other scoring methods may also be used to score the relatedness of the web content to "Olympics." For example, if the analyzed web content is an image or a video clip, an algorithm for identifying image patterns may be used to determine whether any patterns signify the relatedness to "Olympics." After scoring the pieces of web content 310a and 310b, whether the web content is related to "Olympics" may be determined based on the score. For example, the pieces of web content 310a and 310b having a score greater than a threshold value may be determined as being related to the anticipated content trend topic "Olympics."

Multiple classifiers may be provided, each analyzing the web content for different anticipated content trend topics. Therefore, the web content may be scored by the different classifiers, and receive a score, for different anticipated content trend topics. Depending on the scores by different classifiers, the web content may be associated with multiple anticipated content trend topics. Also, a maximum number of anticipated content trend topics for which a piece of web content may be associated with may be set, and the anticipated content trend topics may be associated with the web content in the order of highest score to the lowest.

Diagram 300 shows that both pieces of web content 310a and 310b are determined as being related to the anticipated content trend topic "Olympics." If web content is determined as being related to an anticipated content trend topic, then association is made with the web content and the anticipated content trend topic by, for example, creating metadata at the web content which identify that the web content relates to the anticipated content trend topic. Specifically, a tag with the text "Olympics" may be written into the pieces of web content 310a and 310b. Pieces of web content 310a and 310b which have been associated with the anticipated content trend topic "Olympics" are then clustered together such that they may be easily accessed as a group. Diagram 300 shows that the pieces of web content 310a and 310b are clustered together in cluster 312. Cluster 312 may be, for example, a data store which may store the pieces of web content 310a and 310b, along with other pieces of web content that are associated with the anticipated content trend topic "Olympics."

In addition to creating metadata for each piece of web content that is related to the anticipated content trend topic, a reverse index (e.g., reverse indexes 222) may also be generated which indexes the web content that is related to the anticipated content trend topic. For example, a reverse index may be generated for "Olympics," and may index the pieces of web content 310a and 310b, along with other pieces of web content which are determined as being related to "Olympics."

The clustered web content in the cluster 312 may be provisioned to the user when determination is made that the anticipated content trend topic associated with the cluster has occurred. The clustered web content may be provisioned by displaying, or "serving," the clustered web content as a group to the user. For example, a user may access a social network, and may request a status update 314 (new pieces of web content that are shared on the social network since the user last accessed the social network) by his or her friends. The status update 314 may include pieces of web content of various anticipated content trend topics, and determination may be made whether more than a predetermined number of pieces of web content relate to the same anticipated content trend topic. The anticipated content trend topic relating to the web content may be determined, for example, based on metadata that are created as discussed above. An anticipated content trend topic can be determined to have occurred if more than a predetermined number of pieces of web content of the status update 314 relate to the same anticipated content trend topic. Diagram 300 shows that status 314 includes two pieces of web content that relate to the anticipated content trend topic "Olympics." If two pieces of web content exceeds the predetermined threshold, determination may be made that an anticipated trend topic "Olympics" has occurred, and the web content that is clustered in the cluster 312 may be displayed to the user along with the rest of the status update 314. The clustered web content may be quickly identified by accessing the reverse index for the anticipated content trend topic "Olympics."

Determination whether an anticipated content trend topic has occurred may also be determined based on the trend time associated with the anticipated content trend topic that is determined as discussed above. For example, the trend times for each of the anticipated content trend topics for which clusters are made may be periodically analyzed to determine whether trend time has come. If the trend time for an anticipated content trend topic has come, the clustered web content associated with the anticipated content trend topic may be displayed to the user, or otherwise communicated to the user (e.g., sending an email).

Occurrence of anticipated content trend topics may also be determined based on other indicators which may suggest that a content trend topic is currently occurring. For example, search queries from multiple users may include a search for a specific content trend topic (e.g., "Olympics"). Based on such search queries, determination may be made whether an anticipated content trend topic is occurring.

In an aspect of the subject technology, determination may be made whether an anticipated content trend topic has passed trend time such that the content trend topic is no longer occurring. If determination is made that the trend time for an anticipated content trend topic has passed, new pieces of web content that are shared or posted on the web are no longer analyzed to determine their relatedness to the anticipated content trend topic, and the clustered web content associated with the anticipated content trend topic is no longer maintained as a cluster. The passing of the trend time may also be determined based on analyzing the status updates (e.g., status update 314) that are requested by the user. For example, if the number of pieces of web content contained in the status update 314 that relate to the anticipated content trend topic "Olympics" is below a predetermined threshold for a certain period of time, determination may be made that the trend time for "Olympics" has passed.

After determination is made that a trend time for an anticipated content trend topic has passed, the web content that is associated with the anticipated content trend topic may be identified (e.g., through the reverse index), and the associations with the anticipated content trend topic may be removed. The web content may also be analyzed to remove any associations that are older than a predetermined period of time.

Figure 4:
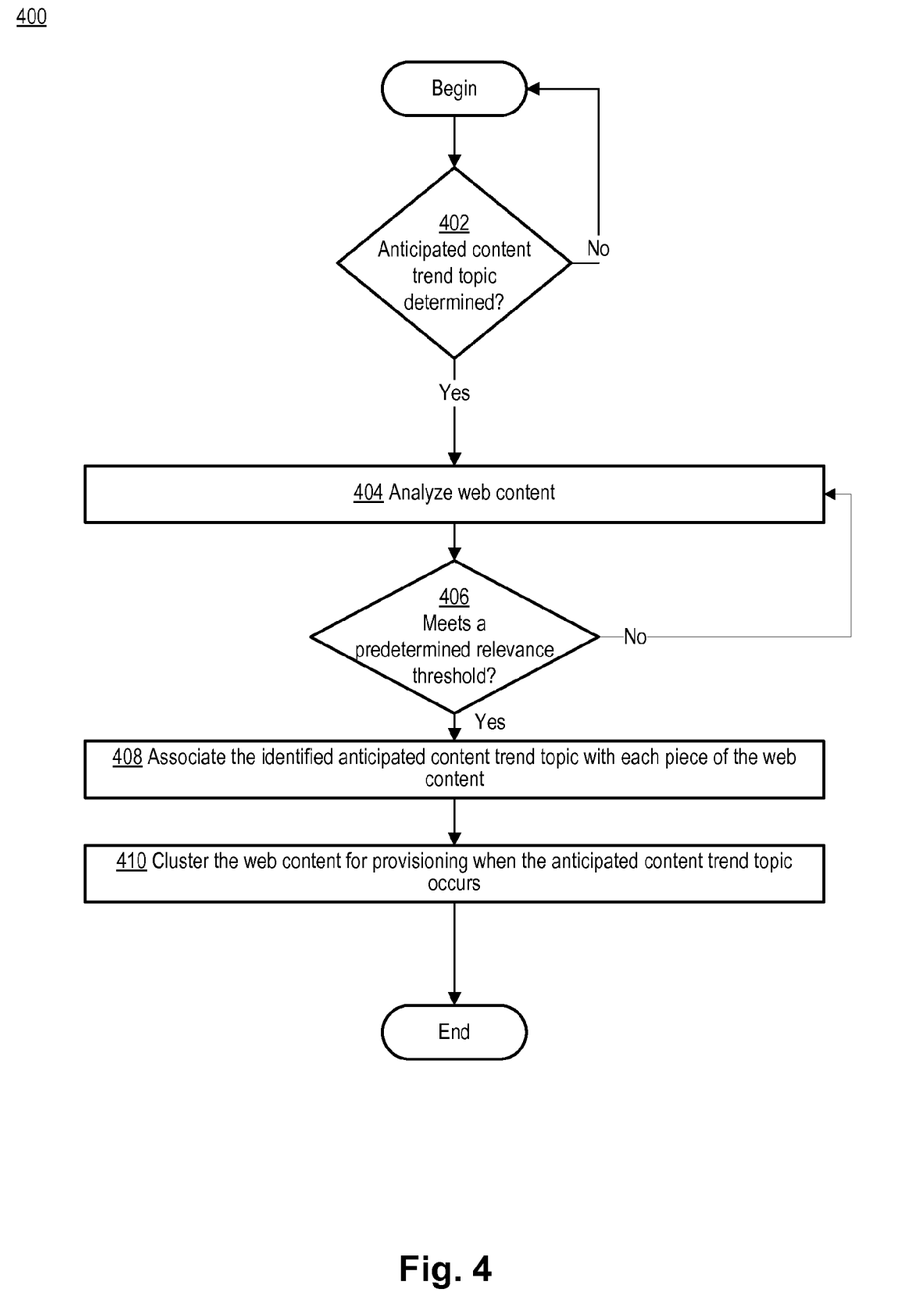
FIG. 4 illustrates an example flow diagram of example processes for clustering content based on anticipated content trend topics.

FIG. 4 illustrates a flow diagram of example processes 400 for clustering content based on anticipated content trend topics. The processes of FIG. 4 may be performed by, for example, system 202. However, the operations of FIG. 4 are not limited to such a system, and may be performed using other systems/configurations.

Process 400 begins at block 402 where a content trend topic of web content that is anticipated to occur at a future time is determined, where the content trend topic is associated with an event. The anticipated content trend topic may be determined, for example, by analyzing posts on social networks, news articles, or online knowledge databases. If an anticipated content trend topic is determined, at block 404, analysis is made of web content (e.g., web content 220) against the anticipated content trend topic identified at block 404, to determine, at block 406, whether the web content meets a predetermined relevance threshold for the identified anticipated content trend topic. If at block 402 an anticipated content trend topic is not determined, process 400 is repeated from the beginning. Process 400 does not continue and until an anticipated content trend is determined at block 402.

In analyzing the web content to determine whether the web content meets a predetermined relevance threshold, a score may be generated for the web content, where the score indicates the degree of relevance of the web content to the anticipated content trend topic against which the web content is analyzed. For example, a score of 0-9 may be generated for the web content, 0 indicating the least relatedness to the anticipated content trend topic, and 9 indicating the most relatedness to the anticipated content trend topic. If the score exceeds a predetermined number, the web content may be determined as meeting a relevance threshold. The score required for determining that the web content meets a relevance threshold may be different for different anticipated content trend topics for which the web content is analyzed against.

If, at block 406, the analyzed web content is determined not to meet a predetermined relevance threshold, process 400 ends. On the other hand, if the analyzed web content is determined to meet the predetermined relevance threshold, at block 408, the identified anticipated content trend topic is associated with each piece of web content that meets the relevance threshold. The association may be made, for example, by creating metadata at the web content that indicates that the web content is associated with the identified anticipated content trend topic. Specifically, a tag describing the anticipated content trend topic may be written onto the web content.

At block 410, the web content associated with the identified anticipated content trend topic is clustered for provisioning when the anticipated content trend topic occurs. For example, the web content associated with the identified anticipated trend topic may be stored at the same data store such that the associated pieces of web content are stored physically, or logically, within proximity of each other such that all associated pieces of web content may be accessed relatively quickly as a group.

Figure 5:
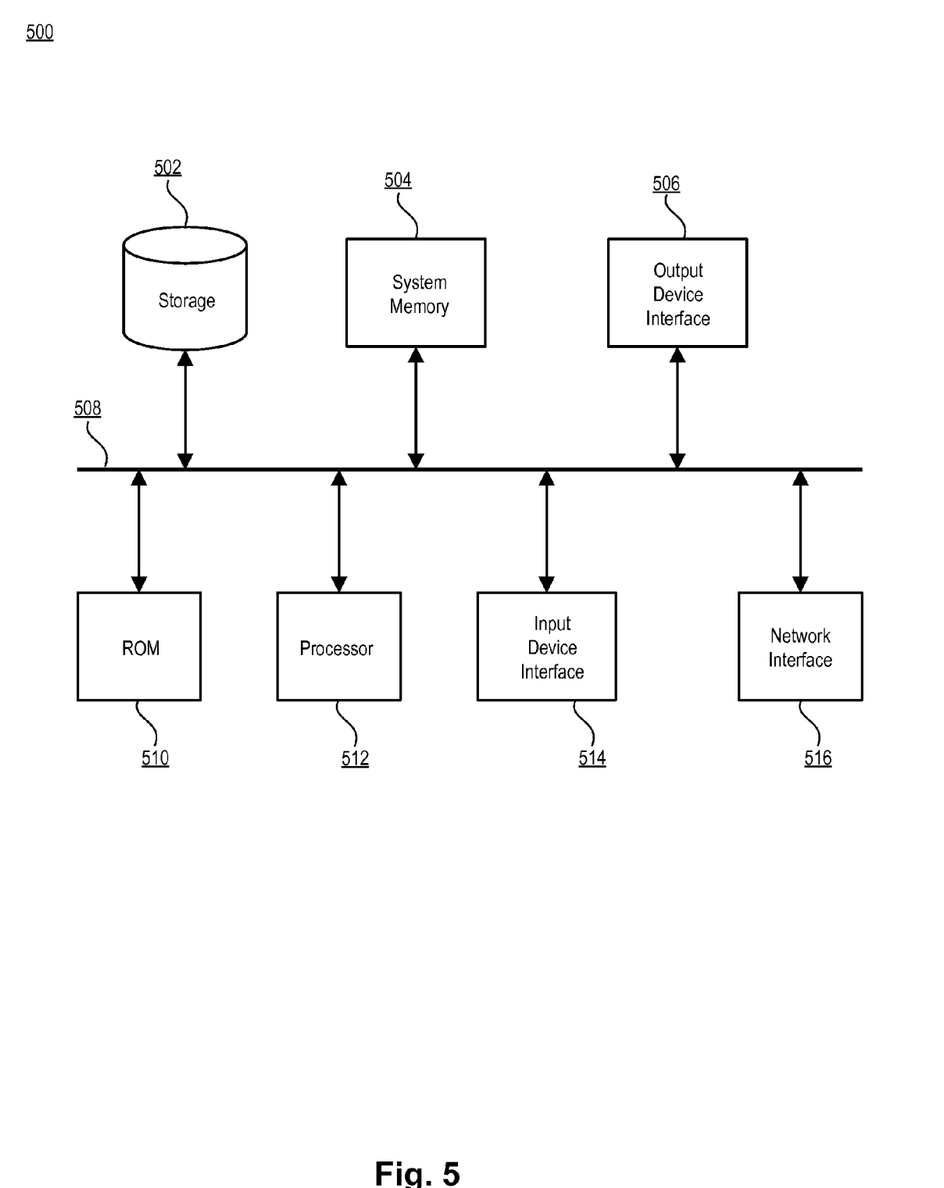
FIG. 5 conceptually illustrates an electronic system with which some implementations of the subject technology are implemented.

FIG. 5 conceptually illustrates an electronic system with which some implementations of the subject technology are implemented. Electronic system 500 can be a computer, phone, PDA, or any other sort of electronic device. Such an electronic system includes various types of computer-readable media and interfaces for various other types of computer-readable media. Electronic system 500 includes a bus 508, processing unit(s) 512 (e.g., processor(s)), a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502. From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such as a random access memory. System memory 504 stores some of the instructions and data that the processor needs at runtime. In some implementations, the processes of the subject disclosure are stored in system memory 504, permanent storage device 502, and/or ROM 510. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interface 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessors or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer-readable medium" and "computer-readable media" are entirely restricted to tangible, physical objects that store information in a form that is readable by a computer. These terms exclude any wireless signals, wired download signals, and any other ephemeral signals.

To provide for interaction with a user, implementations of the subject technology described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user.

Aspects of the subject technology described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject technology described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that not all illustrated steps be performed. Some of the steps may be performed simultaneously. For example, in certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A computer-implemented method comprising:
   determining content that identifies a particular event anticipated to occur at a future time;
   determining that a length of time, during which interactions with respect to the content occur, exceeds a predetermined trend time;
   identifying a content trend topic associated with the particular event that is anticipated to occur at the future time, the content trend topic being identified based on the length of time, during which the interactions with respect to the content occur, exceeding the predetermined trend time;
   determining content items that meet a predetermined relevance threshold for the identified content trend topic;
   associating the identified content trend topic with the content items that meet the predetermined relevance threshold; and
   clustering the content items associated with the identified content trend topic for provisioning when the content trend topic anticipated to occur at the future time does occur.

2. The computer-implemented method of claim 1, wherein the identified content trend topic is associated with the content items by marking at least one of the content items with metadata corresponding to the identified content trend topic.

3. The computer-implemented method of claim 1, wherein the identified content trend topic is associated with the content items by generating a reverse index for the identified content trend topic, the reverse index indexing at least one of the content items that is associated with the identified content trend topic.

4. The computer-implemented method of claim 1, wherein the content trend topic anticipated to occur at the future time is identified based on analyzing content indicating scheduling information for the particular event.

5. The computer-implemented method of claim 1, wherein the content trend topic anticipated to occur at the future time is determined based on manual entry of user input.

6. The computer-implemented method of claim 1, wherein the content trend topic anticipated occur at the future time is determined based on identifying a repeating pattern of occurrences of past content trend topics.

7. The computer-implemented method of claim 1, wherein the content trend topic anticipated to occur at the future time is determined based on information from an on-line knowledge database.

8. The computer-implemented method of claim 1, further comprising determining whether the content trend topic anticipated to occur at the future time has occurred, and if the content trend topic has occurred, providing the clustered content for display on a client device associated with a user of a social network.

9. The computer-implemented method of claim 8, wherein determining whether the content trend topic anticipated to occur at the future time has occurred comprises analyzing content selected for display to the user.

10. The computer-implemented method of claim 1, wherein the content items comprise at least one of text entry, video clip, audio clip, web articles, or location information of a user.

11. A system comprising:
a memory storing executable instructions; and
a processor coupled to the memory, the processor configured to execute the stored executable instructions to:
determine content that identifies an event anticipated to occur at a future time;
determine that a length of time, during which interactions with respect to the content occur, exceeds a predetermined trend time;
identify a topic associated with the event that is likely to correspond to a future content trend, the future content trend being identified based on the length of time, during which the interactions with respect to the content occur, exceeding the predetermined trend time;
analyze one or more posts that are shared on a social network to determine whether the one or more posts meet a predetermined relevance threshold for the identified topic;
associate the identified topic with each of the one or more posts that meet the predetermined relevance threshold; and
cluster the one or more posts associated with the identified topic for provisioning when the future content trend occurs.

12. The system of claim 11, wherein the identified topic is associated with the each of the one or more posts by generating a reverse index for the identified topic, the reverse index indexing each of the one or more posts associated with the identified topic.

13. The system of claim 11, wherein the identified topic is associated with each of the one or more posts by marking each of the one or more posts with metadata corresponding to the identified topic.

14. The system of claim 11, wherein the future content trend is determined based on identifying a repeating pattern of occurrences of past content trends.

15. The system of claim 11, wherein the future content trend is determined based on information from an on-line knowledge database.

16. The system of claim 11, wherein the executable instructions cause the processor to determine whether the future content trend has occurred, and if the future content trend has occurred, provide the clustered one or more posts for display on a client device associated with a user of the social network.

17. The system of claim 16, wherein whether the executable instructions cause the processor to analyze posts that are selected for display to the user of the social network for determining whether the future content trend has occurred.

18. The system of claim 11, wherein the one or more posts comprise at least one of text entry, video clip, audio clip, web articles, or location information of one or more users of the social network.

19. A machine-readable storage medium comprising instructions stored therein, which when executed by processors, cause the processors to perform operations comprising:
determining content that identifies an event anticipated to occur at a future time;
determining that a length of time, during which interactions with respect to the content occur, exceeds a predetermined trend time;
identifying a content trend topic associated with the event that is anticipated to occur at the future time, the content trend topic being identified based on the length of time, during which the interactions with respect to the content occur, exceeding the predetermined trend time;
analyzing content items of the determined content that is shared on a social network to determine whether the content items meet a predetermined relevance threshold for the identified content trend topic;
associating the identified content trend topic with the content items that meet the predetermined relevance threshold by marking the content items with metadata corresponding to the identified content trend topic;
clustering the content items associated with the identified content trend topic;
determining whether the content trend topic has occurred based on analyzing at least one of the content items selected for display to a user of the social network; and
provisioning the clustered content items to the user of the social network when the content trend topic is determined to have occurred.

20. The machine-readable medium of claim 19, wherein the content items comprise at least one of text entry, video clip, audio clip, web articles, or location information of one or more users of the social network.

* * * * *